United States Patent Office 2,857,398
Patented Oct. 21, 1958

2,857,398
SUCCINIMIDE COMPOUNDS AND METHOD FOR OBTAINING THE SAME

Charles A. Miller, Detroit, and Loren M. Long, Grosse Pointe Woods, Mich., assignors to Parke, Davis & Company, Detroit, Mich., a corporation of Michigan No Drawing. Application February 26, 1952
Serial No. 273,547

3 Claims. (Cl. 260—326.5)

This invention relates to succinimide compounds manifesting chemotherapeutic activity and to a process for preparing the same. More particularly, the invention relates to o-hydroxyphenylsuccinimides having the general formula,

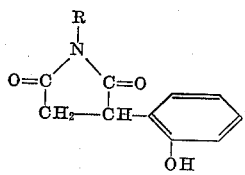

wherein R is hydrogen or a methyl radical.

In accordance with the invention, the above products are produced by reacting either α-(o-hydroxyphenyl)succinic acid or α-(o-hydroxyphenyl)succinic anhydride with at least one chemical equivalent of ammonia, conveniently in the form of ammonium hydroxide, or of methylamine, and heating the intermediate products so obtained at a temperature between about 100° and 350° C.

In carrying out the initial part of the process, it is advantageous but not essential to employ an inert solvent such as water, a lower aliphatic alcohol or a mixture of the same, ether, benzene, toluene or the like, to facilitate the reaction of the succinic acid or anhydride with ammonia or methylamine. The relative quantities of the reactants are not particularly critical; but, from the standpoint of economy, at least one and preferably several equivalents of ammonia or of methylamine should be used for each equivalent of the α-(o-hydroxyphenyl)succinic acid or anhydride. The intermediate products differ, depending on which of the two foregoing starting materials is employed and also on the amount of ammonia or of methylamine used. When α-(o-hydroxyphenyl)succinic anhydride is used with one equivalent of ammonia or of methylamine, the intermediate is the half-amide; while, if two or more equivalents of ammonia or of methylamine are used, the intermediate product is the ammonium or the methylamine salt of the half-amide of α-(o-hydroxyphenyl)succinic acid. In the case where α-(o-hydroxyphenyl)succinic acid is used as the starting material, the intermediate product is either the mono- or di-ammonium or methylamine salt of α-(o-hydroxyphenyl)succinic acid. As stated previously, these intermediate products may be converted to the desired succinimide compounds by heating them at a temperature between about 100° and 350° C. The preferred temperature for this conversion is in the region of 190° to 210° C., at which temperature the reaction is complete in about one hour.

The products of the invention possess valuable therapeutic properties and are particularly useful in the treatment of the petit mal type of epilepsy.

The invention is illustrated by the following examples.

Example 1

10 g. of α-(o-hydroxyphenyl)succinic acid is added gradually to 10 cc. of concentrated ammonium hydroxide and the water and excess ammonia removed by distillation. The temperature of the residue is raised to and maintained at 200° C. until ammonia ceases to be evolved. The residue is dissolved in dry ether, the solution decolorized with charcoal and the ether distilled. The solid product is recrystallized from water to obtain the desired α-(o-hydroxyphenyl)succinimide; M. P. 207–209° C. Yield: 44 percent.

Example 2

10 g. of α-(o-hydroxyphenyl)succinic acid is added gradually to 20 g. of aqueous methylamine and the water and excess methylamine removed by distillation. The temperature of the residue is raised to and maintained at 200° C. until methylamine ceases to be evolved. The residue is dissolved in dry ether, the solution decolorized with charcoal and the ether distilled. The residue is distilled in vacuo to obtain the desired N-methyl-α-(o-hydroxyphenyl)succinimide; M. P. 136–138° C. Yield: 57 percent.

Example 3

10 g. of α-(o-hydroxyphenyl)succinic anhydride is added gradually to 10 cc. of concentrated ammonium hydroxide and the water and excess ammonia removed by distillation. The residue is heated at 210° C. until ammonia ceases to be evolved, cooled and dissolved in dry ether. The ether solution is decolorized with charcoal, the ether distilled and the residue recrystallized from water to obtain the desired α-(o-hydroxyphenyl)succinimide; M. P. 207–9° C. Yield: 47 percent.

What we claim is:

1. A succinimide compound of formula,

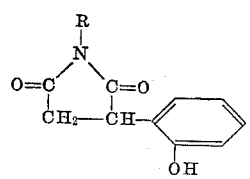

where R is a member of the class consisting of hydrogen and methyl radicals.

2. α-(o-hydroxyphenyl)succinimide.
3. N-methyl-α-(o-hydroxyphenyl)succinimide.

References Cited in the file of this patent

UNITED STATES PATENTS 2,643,259   Miller et al. _____ June 23, 1953

FOREIGN PATENTS 389,948   Germany _____ Aug. 1, 1922

OTHER REFERENCES

Jour. Am. Chem. Soc., vol. 73, pages 4895–4896 (1951).